Patented Apr. 27, 1943

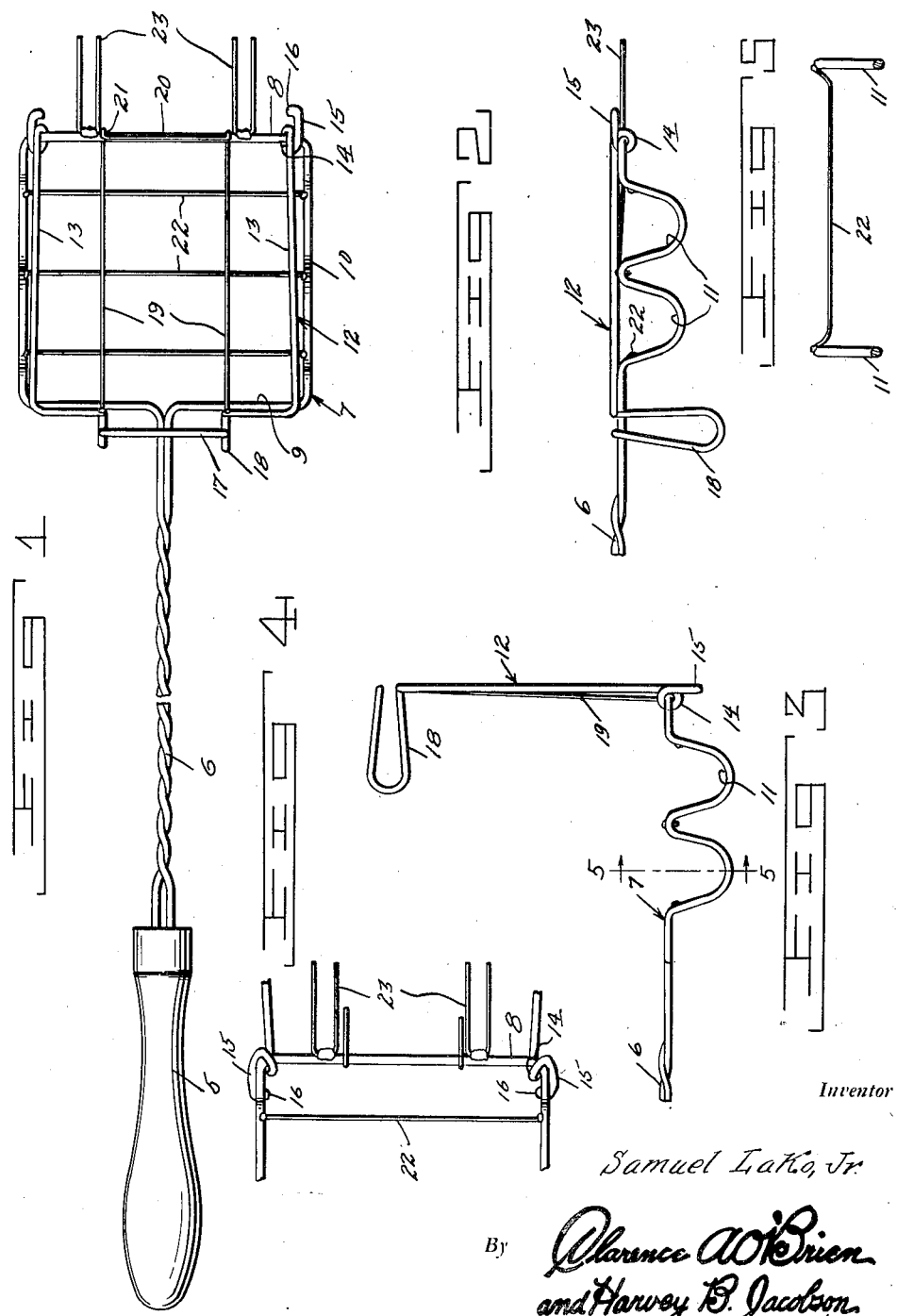

2,317,388

UNITED STATES PATENT OFFICE 2,317,388

ROASTER

Samuel Lako, Jr., Chino, Calif.

Application January 23, 1942, Serial No. 428,007

7 Claims. (Cl. 53—5)

The present invention relates to new and useful improvements in roasters or broilers for frankfurters, hamburgers and similar food products and has for its primary object to provide a device of this character embodying means for clamping a plurality of frankfurters in spaced relation, and also including a grill upon which hamburgers may be supported, as well as prongs for impaling marshmallows thereon, whereby the several food products may be cooked either separately or simultaneously.

A further object is to provide a novel hinged top construction for clamping certain of the food products in position while cooking.

Another object is to provide a device of this character of simple and practical construction, which is efficient and reliable in use, relatively inexpensive to manufacture and otherwise well adapted for the purposes for which the same is intended.

Other objects and advantages reside in the details of construction and operation as more fully hereinafter described and claimed, reference being had to the accompanying drawing forming part hereof, wherein like reference numerals refer to like parts throughout, and in which:

Figure 1 is a top plan view.

Figure 2 is a fragmentary side elevational view with the top in closed position.

Figure 3 is a similar view showing the top raised.

Figure 4 is a fragmentary top plan view showing the top in completely open position, and Figure 5 is a sectional view taken substantially on a line 5—5 of Figure 3.

Referring now to the drawing in detail, wherein for the purpose of illustration I have disclosed a preferred embodiment of my invention, the numeral 5 designates a handle from which the twisted wire members 6 project, having the open frame 7 at their outer ends, the frame being of any desired shape in plan, the present form of the invention including spaced parallel front and rear portions 8 and 9 and spaced parallel side portions 10, the corners of the frame being rounded.

The side portions are curved downwardly at intervals to form a plurality of valleys 11, the valleys at the opposite sides of the frame being aligned to receive a frankfurter therein.

The frankfurters are secured in the valleys by means of an open top 12 which includes spaced parallel side members 13 having their front ends coiled to form eyes 14 hingedly mounted on the front portion 8 of the frame and terminating in forwardly projecting stops 15 having inturned ends 16. The eyes are inclined from a vertical plane and the side members are normally under outwardly spread tension and adapted to be sprung inwardly toward each other by reason of the eyes bearing against the sides of the frame when the top is in closed position, and thus exert an opening force on the top.

When the top is in its fully opened position, the spreading of the side members will cause the eyes to ride partly around the corners of the frame to move the stops outwardly of the sides of the frame and bring the ends 16 of the stops into position for engaging the sides of the frame as shown in Figure 4 and thus limit opening movement of the top and prevent swinging of the top beyond a position on a horizontal plane with the frame.

The rear ends of the side members of the top are joined by a cross-member 17 having downturned loops 18 formed therein engaging the rear frame member to form catches to secure the top in closed position.

A pair of spaced parallel longitudinally extending bars 19 are connected at one end to the rear or free end of the top and the other ends of the bars are connected by a cross-member 20 having partially closed eyes 21 at its point of connection with the bars to provide a hinged connection for the bars on the front frame member 8.

The frame is also provided with a plurality of transverse bars 22 above the valleys 11 and below the top 12 and adapted to provide a support for a hamburger.

Also projecting forwardly from the front frame member 8 are a plurality of pairs of prongs 23 adapted for impaling marshmallows thereon.

From the foregoing it will be apparent facilities are provided for holding the several types of food in a suitable manner for cooking the same either individually or simultaneously, a single top serving to clamp the frankfurters and hamburgers in position on the frame.

It is believed that details of construction and manner of use of the device will be readily understood from the foregoing without further detailed explanation.

Having thus described the invention what I claim is:

1. A roaster comprising a wire frame including front, rear and side frame members, said side frame members being curved downwardly at spaced intervals to form aligned valleys adapted for supporting frankfurters therein, a top of substantially U-shaped wire construction, eyes formed at the ends of the top pivotally connecting the same to one of the frame members, and catches formed from a portion of the top at the free end thereof for releasable engagement with an opposite frame member.

2. A roaster comprising a wire frame including front, rear and side frame members, adapted to support food to be cooked thereon, a top of substantially U-shaped construction, eyes formed at the ends of the top pivotally connecting the same to one of the frame members, said eyes being inclined laterally and engaging the sides of adjacent frame members at the corners thereof and adapted to create spring tension on the free edge of the top to urge the top into its open position, and a catch on the free edge of the top for releasably securing the top to the frame.

3. A roaster comprising a frame composed of front, rear and side frame members, said side frame members being offset downwardly and adapted to support food to be cooked in said offset portions, spaced parallel supporting bars connecting the side frame members intermediate the upper and lower extremities of the offset portions and adapted to form a food supporting rack at a plane below the horizontal plane of the top of the frame for supporting additional food products to be cooked thereon, and a top structure carried by the fame for covering and securing the food in position thereon.

4. A roaster comprising a frame composed of front, rear and side frame members, said side frame members being offset downwardly and adapted to support food to be cooked in said offset portions, spaced parallel supporting bars connecting the side frame members intermediate the upper and lower extremities of the offset portions and adapted to form a food supporting rack at a plane below the horizontal plane of the top of the frame for supporting additional food products to be cooked thereon, and a top of open frame construction pivoted to one of the frame members and adapted to secure the food in position thereon.

5. A roaster comprising a frame composed of front, rear and side frame members, said side frame members being offset downwardly and adapted to support food to be cooked in said offset portions, spaced parallel supporting bars connecting the side frame members intermediate the upper and lower extremities of the offset portions and adapted to form a food supporting rack at a plane below the horizontal plane of the top of the frame for supporting additional food products to be cooked thereon, a top of open frame construction pivoted at one edge to one of the frame members, and catch means at the free edge of the top releasably engaging another of the frame members for securing the food in position on the frame.

6. A roaster comprising a frame composed of front, rear and side frame members, said side frame members being offset downwardly and adapted to support food to be cooked in said offset portions, spaced parallel supporting bars connecting the side frame members intermediate the upper and lower extremities of the offset portions and adapted to form a food supporting rack at a plane below the horizontal plane of the top of the frame for supporting additional food products to be cooked thereon, a top of open frame construction pivoted at one edge to one of the frame members, and downturned loops on the opposite edge of the top and formed from a part of the top material to provide catch members engageable with another of the frame members for securing the food in position on the frame.

7. A roaster comprising a wire frame including front, rear and side frame members, adapted to support food to be cooked thereon, a top of substantially U-shaped construction, eyes formed at the ends of the top pivotally connecting the same to one of the frame members, said eyes being inclined laterally and engaging the sides of adjacent frame members at the corners thereof and adapted to create spring tension on the free edge of the top to urge the top into its open position, stops on the top engaging the side frame members to limit opening movement of the top, and a catch on the free edge of the top for releasably securing the top in closed position.

SAMUEL LAKO, JR.